United States Patent
Li

(10) Patent No.: US 12,467,052 B2
(45) Date of Patent: Nov. 11, 2025

(54) STRIATIN INTERACTING PROTEIN INHIBITOR AND USE THEREOF IN PREPARATION OF ANTI-TUMOR DRUG

(71) Applicant: HANGZHOU GONGCHU BIOTECHNOLOGY CO., LTD., Zhejiang (CN)

(72) Inventor: Gongchu Li, Zhejiang (CN)

(73) Assignee: HANGZHOU GONGCHU BIOTECHNOLOGY CO., LTD., Hangzhou (CN)

( * ) Notice: Subject to any disclaimer, the term of this patent is extended or adjusted under 35 U.S.C. 154(b) by 992 days.

(21) Appl. No.: 17/286,486

(22) PCT Filed: Oct. 12, 2019

(86) PCT No.: PCT/CN2019/110713
§ 371 (c)(1),
(2) Date: Apr. 18, 2021

(87) PCT Pub. No.: WO2020/078274
PCT Pub. Date: Apr. 23, 2020

(65) Prior Publication Data
US 2022/0275370 A1 Sep. 1, 2022

(30) Foreign Application Priority Data
Oct. 18, 2018 (CN) .......................... 201811215763.2

(51) Int. Cl.
*C12N 15/113* (2010.01)
*A61K 35/768* (2015.01)
*A61P 35/00* (2006.01)

(52) U.S. Cl.
CPC ........ *C12N 15/1137* (2013.01); *A61K 35/768* (2013.01); *A61P 35/00* (2018.01); *C12N 2310/14* (2013.01); *C12N 2310/531* (2013.01); *C12N 2710/24132* (2013.01); *C12N 2710/24143* (2013.01)

(58) Field of Classification Search
CPC ............... A61K 35/768; A61K 48/005; C12N 2310/14; C12N 2310/531; C12N 2710/24132; C12N 2710/24143; C12N 15/63; C12N 15/86; C12N 15/113; C12N 15/1137; A61P 35/04; A61P 35/00; Y02A 50/30
See application file for complete search history.

(56) References Cited

FOREIGN PATENT DOCUMENTS

| CA | 3009551 A1 | 6/2017 |
| CN | 109453392 A | 3/2019 |

OTHER PUBLICATIONS

Bai, Identification and characterization of a set of conserved and new regulators of cytoskeletal organization, cell morphology and migration. BMC Biology, 9:54 (Year: 2011).*
International Search Report of PCT/CN2019/110713.
Written Opinion of PCT/CN2019/110713.
Chris D. Madsen et al. STRIPAK components determine mode of cancer cell migration and metastasis Nat Cell Biol.
V Wagh et al. Fam40b is required for lineage commitment of murine embryonic stem cells Cell Death and Disease.

* cited by examiner

*Primary Examiner* — J. E. Angell
*Assistant Examiner* — Julio Washington Gomez Rodriguez

(57) ABSTRACT

This invention relates to the field of biomedical engineering technology, and provides the application of striatin interacting protein (STRIP) inhibitors in the preparation of anti-tumor drugs, recombinant vectors of STRIP inhibitors and their application in the preparation of anti-tumor drugs, and anti-tumor pharmaceutical compositions in which STRIP inhibitors or recombinant vectors of STRIP inhibitors are used as active components. This invention aiming at STRIP inhibition can be used to prepare viral drugs for tumor treatment, in particular when it is recombined with vaccinia viruses to form recombinant vectors, which combine the advantages of STRIP inhibitors and vaccinia viruses. The invention provides a new target for viral therapy of tumor and has a broad clinical application prospect.

5 Claims, 12 Drawing Sheets
Specification includes a Sequence Listing.

(A)

(B)

(c)

SEQUENCE LISTING

<160> NUMBER OF SEQ ID NOS: 6

<210> SEQ ID NO 1
<211> LENGTH: 70
<212> TYPE: RNA
<213> ORGANISM: Artificial
<220> FEATURE:
<223> OTHER INFORMATION: Synthesized

<400> SEQUENCE: 1
agaucuccgg gcucaagcac uuuaaguuga acucgaguuc aacuuaaagu gcuugagcuu    60
uuugucuaga    70

<210> SEQ ID NO 2
<211> LENGTH: 70
<212> TYPE: RNA
<213> ORGANISM: Artificial
<220> FEATURE:
<223> OTHER INFORMATION: Synthesized

<400> SEQUENCE: 2
agaucuccgg cgaaagcauc aagacucuga acucgaguuc agagucuuga ugcuuucguu    60
uuugucuaga    70

<210> SEQ ID NO 3
<211> LENGTH: 70
<212> TYPE: RNA
<213> ORGANISM: Artificial
<220> FEATURE:
<223> OTHER INFORMATION: Synthesized

<400> SEQUENCE: 3
agaucuccgg gcaucugcuu cagacuugau ucucgagaau caagucugaa gcagaugcuu    60
uuugucuaga    70

<210> SEQ ID NO 4
<211> LENGTH: 58
<212> TYPE: DNA
<213> ORGANISM: Artificial
<220> FEATURE:
<223> OTHER INFORMATION: Synthesized

<400> SEQUENCE: 4
ccgggctcaa gcactttaag ttgaactcga gttcaactta aagtgcttga gctttttg    58

<210> SEQ ID NO 5
<211> LENGTH: 58
<212> TYPE: DNA
<213> ORGANISM: Artificial
<220> FEATURE:
<223> OTHER INFORMATION: Synthesized

<400> SEQUENCE: 5
ccggcgaaag catcaagact ctgaactcga gttcagagtc ttgatgcttt cgttttg    58

<210> SEQ ID NO 6
<211> LENGTH: 58
<212> TYPE: DNA
<213> ORGANISM: Artificial
<220> FEATURE:
<223> OTHER INFORMATION: Synthesized

```
<400> SEQUENCE: 6
ccgggcatct gcttcagact tgattctcga gaatcaagtc tgaagcagat gctttttg        58
```

STRIATIN INTERACTING PROTEIN INHIBITOR AND USE THEREOF IN PREPARATION OF ANTI-TUMOR DRUG

INCORPORATED-BY-REFERENCE OF SEQUENCE LISTING OR TABLE

The material in the accompanying sequence listing is hereby incorporated by reference in its entirety into this application. The accompanying file, named "SEQUENCE_LISTING_ST25.txt" was created on Nov. 8, 2021 and is 1.57 KB.

CROSS-REFERENCE TO RELATED APPLICATIONS

This application is a national stage application of PCT/CN2019/110713. This application claims priorities from PCT/CN2019/110713, filed Oct. 12, 2019, and from the Chinese patent application 201811215763.2 filed Oct. 18, 2018, the content of which are incorporated herein in the entirety by reference.

TECHNICAL FIELD

This invention relates to the field of biomedical technology, specifically relates to striatin interacting protein (STRIP) as the target in the preparation of anti-tumor drugs, as well as vectors and drugs include them.

TECHNICAL BACKGROUND

Oncolytic viruses have been proved to be effective in clinical treatment, which can selectively infect and subsequently destroy the tumor tissue. At present, oncolytic viruses belonging to 10 viral families have entered the stage of clinical trials, including adenoviruses, coxackie viruses, herpes simplex viruses, measles viruses, newcastle disease viruses, parvoviruses, reoviruses, vaccinia viruses and vesicular stomatitis viruses. Herpes simplex virus T-VEC has been approved by FDA to treat melanoma. In general, oncolytic viruses have shown high safety and efficacy in clinical trials.

Vaccinia virus is a large double-stranded DNA virus in the Poxvirus family. Compared with other oncolytic viruses, vaccinia virus has the following advantages: (1) Vaccinia viruses only replicate in cytoplasm to minimize the risk of integrating into host genome, which is unique in DNA virus. (2) Vaccinia viruses were used as vaccines against smallpox virus. Therefore, they possess high security. (3) Vaccinia viruses have powerful capability of gene cloning, allowing the insertion of large gene fragments. (4) The replicating ability of vaccinia viruses is strong.

Vaccinia viruses have shown anti-tumor activity. At present, most of the common oncolytic vaccinia viruses have been modified, including TK gene deletion or TK/vaccinia growth factor gene double deletion. The deletion of TK gene makes the replication of the viruses more dependent on the TK levels in the cells, while TK levels in malignancies are often higher than in normal cells. Moreover, the replication of vaccinia viruses also relies on the epidermal growth factor receptor/Ras (EGFR/Ras) pathway, which makes it highly selective to cancer cells. In summary, oncolytic vaccinia viruses have become an ideal viral vector for cancer therapy because of its ability to target cancer tissues in both experimental animals and humans.

Striatin interacting protein (STRIP) is a component of striatin interacting phosphatases and kinases (STRIPAK) complex (Goudreault, M., L. M. D'Ambrosio, et al. 2009. A PP2A phosphatase high density interaction network identifies a novel striatin-interacting phosphatase and kinase complex linked to the cerebral cavernous malformation 3 (CCM3) protein. Mol Cell Proteomics 8 (1): 157-171.). STRIP contains STRIP1 (GenBank No. NM_033088.3) and STRIP2 (GenBank No. NM_020704.2), also known as FAM40A and FAM40B. Previous researches have shown that STRIP of fruit fly is involved in the negative regulation of CLOCK dephosphorylation, and thus relates to circadian rhythms regulation (Andreazza, S., S. Bouleau, et al. 2015. Daytime CLOCK Dephosphorylation Is Controlled by STRIPAK Complexes in *Drosophila*. Cell Rep 11 (8): 1266-1279.). STRIP1 is an important factor modulating the migration of mouse embryonic mesoderm (Bazzi, H., E. Soroka, et al. 2017. STRIP1, a core component of STRIPAK complexes, is essential for normal mesoderm migration in the mouse embryo. Proc Natl Acad Sci USA 114 (51): E10928-E10936.). STRIP2 plays key role during the differentiation of mouse embryonic stem cells (Sabour, D., S. P. Srinivasan, et al. 2017. STRIP2 Is Indispensable for the Onset of Embryonic Stem Cell Differentiation. Mol Ther Methods Clin Dev 5:116-129.). In addition, inhibition of STRIP1 has been shown to promote the metastasis of breast cancer in mice. Conversely, suppression of STRIP2 inhibited the metastasis of breast cancer in mice (Madsen, C. D., S. Hooper, et al. 2015. STRIPAK components determine mode of cancer cell migration and metastasis. Nat Cell Biol 17 (1): 68-80.).

To summarize, STRIP plays an important role in cell differentiation of both lower and higher organisms. STRIP is also associated with the metastasis of breast cancer cells. However, the regulatory relationship between STRIP and growth/suppression of other tumors has not been reported. Furthermore, when STRIP is combined with oncolytic vaccinia virus, is there a simple vector-based expression relationship between oncolytic vaccinia viruses and STRIP? Can STRIP regulates the replication of oncolytic vaccinia viruses in tumor cells? These has not been reported.

In this study, STRIP was inhibited to regulate the replication of oncolytic vaccinia viruses in tumor cells, and to significantly improve the anti-tumor effect. It provides a new technical approach for the research of anti-tumor oncolytic virus drugs.

The Contents of Invention

The first aim of the invention was to investigate the relationship between STRIP and tumor cells to provide new applications of STRIP inhibitors. The second aim was to study the regulatory relationship between STRIP and oncolytic vaccinia viruses invading tumor cells to provide a new technical approach for the research of oncolytic virus drugs for tumor treatment.

This invention found that the transcription levels of interferon-induced protein with tetratricopeptide repeats 1 (IFIT1), DExH-Box Helicase 58 (DHX58) and interferon-stimulated gene 15 (ISG15) were significantly reduced by siRNA interfering with STRIP1 and STRIP2 in malignant glioblastoma cell line U87MG (FIG. 1).

The interference of STRIP1 by shRNA significantly reduced the expression of antiviral factor IFI16 in SMMC-7721 cell line (FIG. 2).

The interference of STRIP1 enhanced the levels of caspase 3 and caspase 8, indicating that STRIP1 interference improved the sensitivity of tumor cells to apoptotic induction (FIG. 4).

Therefore, the inhibition of STRIP significantly reduced the anti-viral ability of tumor cells, which can be used to prepare viral drugs against tumor.

Therefore, on the one hand this invention provided the application of STRIP inhibitors in the preparation of anti-tumor drugs.

Described STRIP inhibitors in this invention is any substance capable of reducing STRIP activity, reducing STRIP stability, inhibiting STRIP expression, reducing the effective time of STRIP, or suppressing the transcription of STRIP, including but not limited to the following: small interfering molecules that specifically interfere with STRIP expression and processing, such as shRNA, siRNA, anti-sense nucleotides, etc. The antagonist of STRIP, down-regulator and blocker of STRIP. Small interfering RNA molecules, short hairpin RNA or antisense nucleotides that specifically interfere with STRIP gene expression are preferably selected. Short hairpin RNA with simple structure is a more optimum selection.

The short hairpin RNA sequence is shown in the following table:

| Name | sequences | No. |
|---|---|---|
| 1 | AGAUCUCCGGGCUCAAGCACUUUAAGUUGAACUCG AGUUCAACUUAAAGUGCUUGAGCUUUUUGUCUAGA | SEQ ID NO. 1 |
| 2 | AGAUCUCCGGCGAAAGCAUCAAGACUCUGAACUCG AGUUCAGAGUCUUGAUGCUUUCGUUUUUGUCUAGA | SEQ ID NO. 2 |
| 3 | AGAUCUCCGGGCAUCUGCUUCAGACUUGAUUCUCG AGAAUCAAGUCUGAAGCAGAUGCUUUUUGUCUAGA | SEQ ID NO. 3 |

DNA sequence encoding the short hairpin RNA is shown in the following table:

| Name | Sequences | No. |
|---|---|---|
| 1 | 5'-CCGGGCTCAAGCACTTTAAGTTGAACTCG AGTTCAACTTAAAGTGCTTGAGCTTTTTG-3' | SEQ ID NO. 4 |
| 2 | 5'-CCGGCGAAAGCATCAAGACTCTGAACTCG AGTTCAGAGTCTTGATGCTTTCGTTTTTG-3' | SEQ ID NO. 5 |
| 3 | 5'-CCGGGCATCTGCTTCAGACTTGATTCTCG AGAATCAAGTCTGAAGCAGATGCTTTTTG-3' | SEQ ID NO. 6 |

On the other hand, this invention provided recombinant vectors of STRIP inhibitors and their application in the preparation of anti-tumor drugs.

The recombinant vectors of STRIP inhibitors comprise expression vectors and inserted DNA sequences encoding STRIP siRNA, STRIP shRNA or STRIP anti-sense nucleotides.

The vectors as described include viral vectors and non-viral vectors.

The "viral vectors" as described include adenoviruses, adeno-associated viruses, lentiviruses, coxsakie viruses, human herpesviruses, measles viruses, newcastle disease viruses, parvoviruses, polioviruses, reoviruses, vaccinia viruses and vesicular stomatitis viruses. The appropriate viral vectors are familiar to ordinary technician in this field.

The "non-viral vectors" as described include liposomes or lipid complexes, cationic polymers, chitosan polymers and nanoparticle carriers. The appropriate non-viral vectors are familiar to ordinary technician in this field.

In addition, the inventors found that STRIP shRNA significantly inhibited the transcriptional activation of interferon stimulated response element (ISRE) induced by vaccinia viruses, indicating that STRIP inhibition can down-regulate the anti-viral response levels of tumor cells to vaccinia viruses (FIG. 3). The replication level of oncoVV-STRIP1 shRNA in tumor cells was significantly higher than the control virus (FIG. 5).

Third, in particular, this invention provided a recombinant oncolytic vaccinia virus vector expressing STRIP shRNA, and its application in the preparation of anti-tumor drugs was also offered.

Preferred, the vaccinia viruses are Western Reserve vaccinia virus strain, Tiantan vaccinia virus strain, Wyeth vaccinia virus strain, Copenhagen vaccinia virus train, Lister vaccinia virus strain or NYCBH vaccinia virus strain.

Fourth, this invention provided an anti-tumor pharmaceutical composition, including active components and medically acceptable excipients, carriers or diluents. The active components comprise STRIP inhibitors or recombinant vectors of STRIP inhibitors.

The STRIP inhibitors, recombinant vectors of STRIP inhibitors and oncolytic vaccinia viruses oncoVV-STRIP1 shRNA can inhibit the growth of most tumor cells, such as liver cancer, glioma, breast cancer, lung cancer, gastrointestinal carcinoma and prostate cancer.

The recombinant viruses and pharmaceutically acceptable excipients of the invention form anti-tumor drug compositions together, exerting the therapeutic effect more stably. These agents ensured the conformational integrity of STRIP inhibitors and recombinant viruses in this invention. Meanwhile, these agents protect STRIP inhibitors and recombinant viruses from degradation (including but not limited to coagulation, deamination or oxidation).

In generally, the liquid preparations are stable at 2° C.-8° C. for at least one year, and the lyophilized preparations are stable at 30° C. for at least six months. The preparation can be a suspension, a water injection, a freeze-dried or other agent commonly used in the pharmaceutical field.

The administering dosage of the recombined viruses and their compositions vary with the age and weight of the animal and human. The characteristics and severity of the disease, as well as the route of administration, should also be considered. The results of animal experiments can also be used as references, and the total dosage can not exceed a certain range.

the Beneficial Guarantee and Effects of the Invention:

This invention provided the application of STRIP inhibitors in the preparation of anti-tumor drugs. It was proved by experiments that STRIP inhibitors could reduce the anti-virus ability of tumor cells, which were favorable for the replication of viruses in tumor cells. In addition, STRIP interfered by shRNA significantly inhibited the transcriptional activity of ISRE induced by vaccinia viruses, indicating that inhibition of STRIP1 could reduce the anti-viral response of tumor cells to vaccinia viruses. Meanwhile, the replication of oncoVV-STRIP1 shRNA in tumor cells was significantly higher than that of the control virus. Therefore, the inhibition of STRIP in this invention can be used to prepare anti-tumor viral drugs, particularly in the combination with vaccinia viruses to form recombinant vectors, which inherit the advantages of both STRIP inhibitors and vaccinia viruses, thus providing a new target for viral therapy of tumor, which has broad prospect in clinical application.

ILLUSTRATION OF FIGURES

FIG. 1 shows the effects of STRIP1 siRNA and STRIP2 siRNA on the transcriptional levels of antiviral factors (interferon induced protein with tetratricopeptide repeats 1 (IFIT1), DExH-Box helicase 58 (DHX58) and interferon-stimulated gene 15 (ISG15)) in malignant glioblastoma U87MG cell lines.

SPECIFIC IMPLEMENTATION METHODS

The following implementation examples and experimental examples provide further description of the invention, and shall not be considered as limiting the invention. Implementation examples do not include detailed descriptions about traditional methods such as PCR method, construction of vectors and plasmids, methods of inserting genes into vectors, transfection of plasmids. Because these methods are familiar to ordinary technician in this field and have been described in various publications, including Sambrook, J., Fritsch, E. F. and Maniais, T. (1989) Molecular Cloning: A Laboratory Manual, $2^{nd}$ edition, Cold spring Harbor Laboratory Press.

Unless otherwise stated, percentages and parts are calculated by weight. Except otherwise defined, all professional and scientific terms used in the text have the same meaning as those familiar to people skilled in the field. In addition, any similar or equivalent recorded methods and materials can be used in this invention. The preferred implementation methods and materials described in specific implementation methods are just provided as examples.

Example 1. SiRNA Interference of STRIP1 and STRIP2 Induced Significantly Decrease in the Levels of Antiviral Factors STRIP1 or STRIP2 siRNA (Santa Cruz Biotechnology) was transfected into glioma cells U87MG, and non-specific RNA (Santa Cruz Biotechnology) was used as a control. The cell transfection process followed Attractene Transfection Reagent (QIAGEN) Handbook manual:

(1) Before transfection, $3 \times 10^4$ cells per well were seeded in 24-well plates with DMEM medium containing 1% double antibiotics and 10% fetal bovine serum, and cultured in a 37° C., 5% $CO_2$ incubator.

(2) After adherence (generally 2~3 hours, depending on different cells), appropriate amount of RNA was added to 0.5 mL centrifuge tubes following the instructions.

(3) Transfection reagent at 1.5 µL was added to centrifuge tubes in step (2) and diluted to 60 µL by adding culture medium without serum. Samples were vortexed for 10s to mix, and then incubated at room temperature for 10-15 min.

(4) The original cell culture medium was gently aspirate with a pipette, then 500 µL of fresh cell culture medium containing 10% fetal calf serum and 1% double antibiotics was added.

(5) The incubated transfection solution was added to the cells and cultured in incubator 5% $CO_2$ at 37° C. The medium was changed after 6 to 18 hours.

The transcription levels of the above mentioned intracellular antiviral factors including Interferon-induced protein with tetratricopeptide repeats 1 (IFIT1), DexH-Box Helicase 58 (DHX58) and Interferon-stimulated gene 15 (ISG15) are detected by using reverse transcription PCR, GAPDH served as an internal control.

Figure 1:
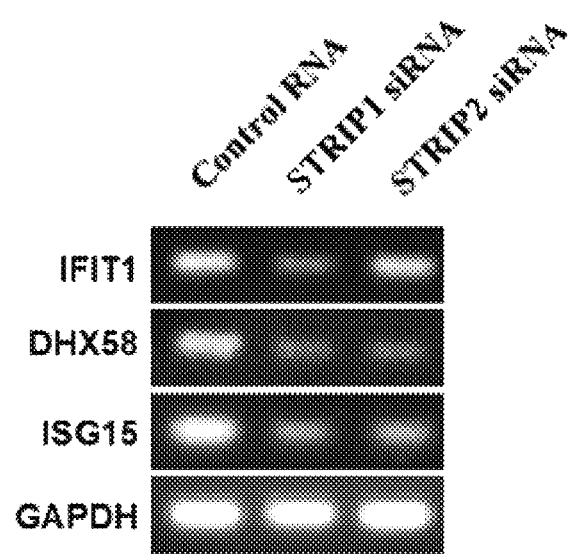

The results are presented in FIG. 1: STRIP1 siRNA significantly reduced the transcription levels of IFIH1, DHX58 and ISG15. STRIP2 siRNA significantly decreased the transcription levels of DHX58 and ISG15. The results indicated that the inhibition of STRIP1 and STRIP2 reduced the antiviral ability of tumor cells.

Example 2. The Expression Level of Anti-Viral Factor IFI16 in SMMC-7721 was Downregulated by STRIP1 shRNA #2

The shRNA #2 interference plasmid of STRIP1 was transfected into SMMC-7721 liver cancer cells to establish a stable expression cell line. The non-specific RNA plasmid was used as a control. The transfected cells were screened with puromycin to isolate stable cell strains. The plasmid transfection method is outlined in Example 1. The cell selection method is as following:

(1) Puromycin was added at a concentration gradient to the cells to be screened.

(2) Appropriate concentration of puromycin was determined which resulted in the death of all the cells 48 hours later.

(3) Cells to be screened were transfect with plasmids. When the transfection rate reached about 50% after 24 to 48 hours, puromycin was added at the concentration determined at step (2) to screen the cells.

(4) Surviving cells showing green fluorescence were remained in puromycin until all cells contained the target plasmid.

The expression levels of STRIP1 and IFI16 in these two kind cells were detected by Western blot. Actin served as the internal control.

The Western blot method is as following:
(1) Preparation of Protein Samples $3 \times 10^5$ cancer cells were seeded on a 6-well plate. After culturing overnight, cells were lysed by 100 µl of SDS lysing buffer containing PMSF (final concentration of 100 µg/ml) on ice for 15 min. Cell lysates were centrifuged at 12000 rpm for 10 min. The supernatants were collected and stored at −20° C.

(2) Protein Quantification (Refer to BCA Protein Quantification Kit)

20 μl of protein standard or protein sample were added to 96-well plates with 100 μl of BCA working reagent. The 96-well plates covered with adhesive paper after shaking gently for 30s, then incubate at 37° C. for 30 min. Plates were cooled to room temperature. OD values were measured at 562 nm. Protein sample concentrations were calculated according to the standard curve.

(3) Protein Sample Pretreatment

1×SDS Loading Buffer was added to the protein sample and boiled for 5 minutes at 95° C. in a metal bath.

(4) the Preparation of SDS Polyacrylamide Gel

The separation glue with different concentration were prepared according to the molecular weight. The two glass plates were aligned and set in the sealing silica gel holder, avoiding glue leaking. 12% separation glue and 5% concentrated glue were prepared. The prepared separation gel was added after pouring out the ddH$_2$O. 5% concentrated gel was then added, and a clean 10-hole 1.5 mm comb was inserted.

(5) SDS Polyacrylamide Gel Loading and Electrophoresis

The glass plate was inserted into the electrophoresis apparatus after the gel was solidified. The running buffer was added after pulling out the comb vertically upwards, and the prepared protein samples were added to each well in turn. The positive and negative electrodes were connected and run at 80 V voltage for about 30 minutes when the sample reached the junction of the concentrated gel and the separation gel, then the voltage was switched to 120 V for about 1 h.

(6) Transferring

When the loading dye reached the bottom of the gel, proteins in the gel were transferred to the membrane as following. Filter paper and sponge were soaked the in the pre-cooled loading buffer. A membrane with appropriate size dipped in methanol for 1 min for activation was also soaked in the loading buffer. With the white side of the clip at the bottom, sponge, two pieces of filter paper, methanol-activated membrane, protein gel, two pieces of filter paper and sponge were placed in order, making sure membrane on the positive electrode side and no bubbles. A small amount of loading buffer was added to drive away bubbles between the membrane and the gel. Pre-cooled loading buffer was added to cover the lid, and transfer the membrane under 100 V for 2 h.

(7) Blocking Non-Specific Binding

Blocking allows antibodies to bind to specific proteins only. Usually, the blocking solution was 5% BSA or skimmed milk powder, which is dissolved in TBST. After the transferring was completed, the membrane was removed and soaked in the pre-prepared blocking solution, and placed on a shaker and incubated for 2 hours or overnight at 4° C. in a refrigerator.

(8) Incubation of Primary Antibody

Primary antibody was added according to the appropriate dilution ratio, generally in 5% BSA (TBST dissolved), placed in an antibody incubation box, and incubated overnight at 4° C. in a refrigerator.

(9) Washing

Membranes were washed with TBST 3 times for 10 minutes each, which washed away the non-specific binding between the primary antibody and the antigen. Failure in washing might result in high background.

(10) Incubation of Secondary Antibody

Corresponding secondary antibody was selected according to the primary antibody, which was diluted in TBST at a ratio of 1:5000, and incubated for 2 h with gentle shaking at room temperature on a shaker.

(11) Washing

The membrane was washed with TBST 3 times for 10 minutes each, so that non-specific binding of the secondary antibody could be washed away. Insufficient washing in this step might also result in a high background.

(12) the Scanning of Membrane

Solution A and B were mixed in a ratio of 1:1 and stored in dark. The solution was dropped on the membrane to make the membrane completely infiltrated, followed by scanning by the ultra-sensitive chemiluminescence instrument.

Figure 2:
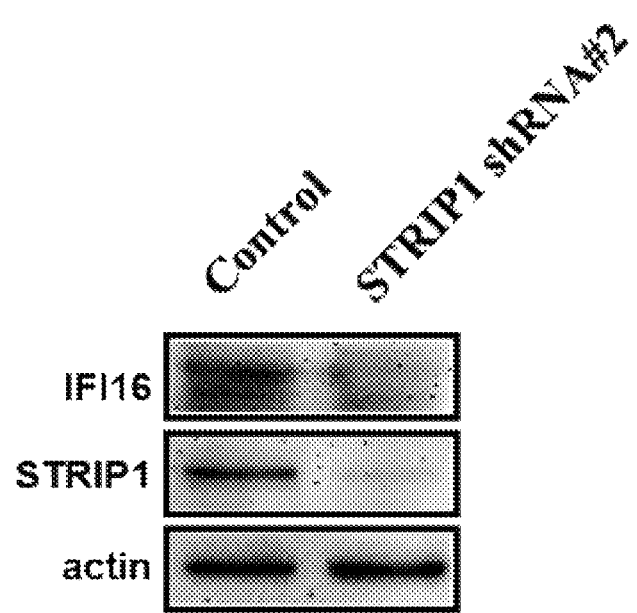
FIG. 2 shows the influence of shRNA interference of STRIP on the expression level of antiviral factor IFI16 in hepatoma cells SMMC-7721.

The results are shown in FIG. 2: STRIP1 shRNA #2 interference reduced the expression level of antiviral factor IFI16 in SMMC-7721 cells, indicating that the inhibition of STRIP1 attenuates the antiviral ability of tumor cells.

Example 3. Activation of Interferon Stimulated Response Element (ISRE) Triggered by Vaccinia Virus Infection can be Inhibited by STRIP1 shRNA #1 in Tumor Cells The plasmid of STRIP1 shRNA #1 was constructed, and stable expression U87MG cell line was established after transfection. Plasmid expressing nonspecific RNA served as a control, which was transfected into cells to establish control cells. Cells were treated with or without vaccinia viruses, and transfected with ISRE-Luc reporter plasmids. Cellular proteins were collected and reporter assay was performed as following:

$8 \times 10^4$ U87MG cells per well were seeded in 24-well plates with 0.5 ml fresh culture medium. After adherence, cells were transfected with ISRE-Luc plasmid and *Renilla*-Luc plasmid at a ratio of 500:1 (transfection procedure has been described above). After 6-8 h, the culture medium was removed, and 0.5 mL of fresh culture medium was added to reduce the toxicity of the transfection reagent. Then, cells were lysed in culture plates by a lysis buffer at 100 μL per well. After appropriate fold dilution of the samples, the assay was performed using a luminometer, and the assay procedure guaranteed that the substrates for firefly luciferin and *Renilla* luciferin are in sufficient excess.

Figure 3:
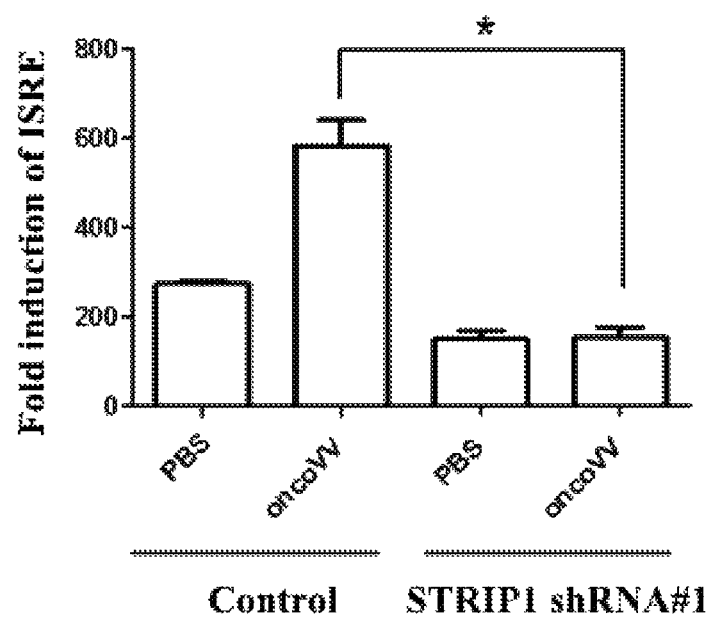
FIG. 3 shows the effects of shRNA interference of STRIP on the activation of interferon stimulated response element (ISRE) induced by vaccinia virus infection in U87MG cells.

The results are shown in FIG. 3: The activation of ISRE by vaccinia viruses was significantly inhibited by STRIP1 shRNA #1, indicating that inhibition of STRIP1 downregulated the anti-viral response level of tumor cells to vaccinia viruses.

Example 4. STRIP1 shRNA #1 Increases the Expression Levels of Caspase 3 and Caspase 8

U87MG cells stably expressing STRIP1 shRNA #1 were lysed. Cells expressing non-specific RNA were used as the control. Proteins were collected and assayed for caspase 3 and caspase 8 by Western blot. Western blot method has been described previously.

Figure 4:
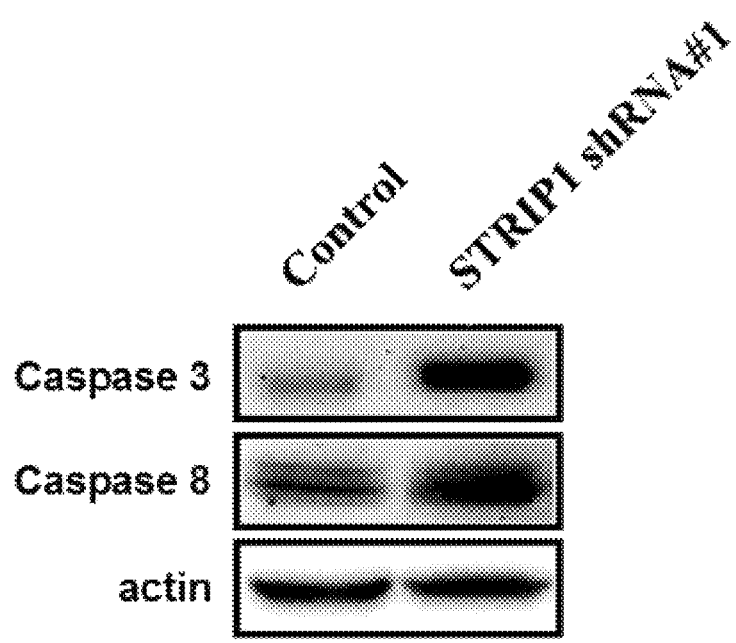
FIG. 4 shows the effects of shRNA interference of STRIP on the expression level of caspase 3 and caspase 8 in U87MG cells.

The results are presented in FIG. 4: the interference of STRIP1 elevated the levels of caspase 3 and caspase 8, indicating that the interference of STRIP1 upregulated the sensitivity of tumor cells to apoptosis induction.

Example 5. STRIP1 shRNA #1 Interference Significantly Inhibited the Growth of U87MG Tumors in Mice In this study, the in vivo growth of U87MG/STRIP1 shRNA #1 cells was examined in comparison with M87MG control cells in nude mice. Animal procedures were carried out strictly according to the NIH guide for laboratory animals. 4-week-old female BALB/C nude mice were selected and subcutaneously injected with the tumor cells as stated at the axillary end of their forelimbs. Each mouse was injected with $1\times10^7$ tumor cells/100 µL. Tumor volumes were measured regularly with a micrometer after transplantation, with the volume of the tumor (mm³)=(length X width²)/2.

Figure 5:
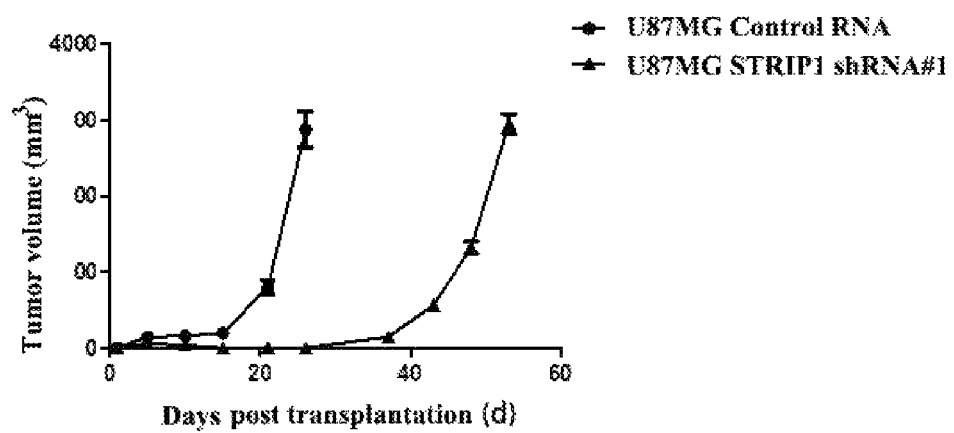
FIG. 5 shows the tumor inhibiting effect of shRNA interference of STRIP on U87MG tumor-bearing mice.

As shown in FIG. 5, STRIP1 shRNA #1 significantly slowed down the growth of subcutaneous xenograft U87MG tumors in nude mice. However, after a period of time, the U87MG/STRIP1 shRNA #1 group eventually reached the same level of control group.

Figure 6:
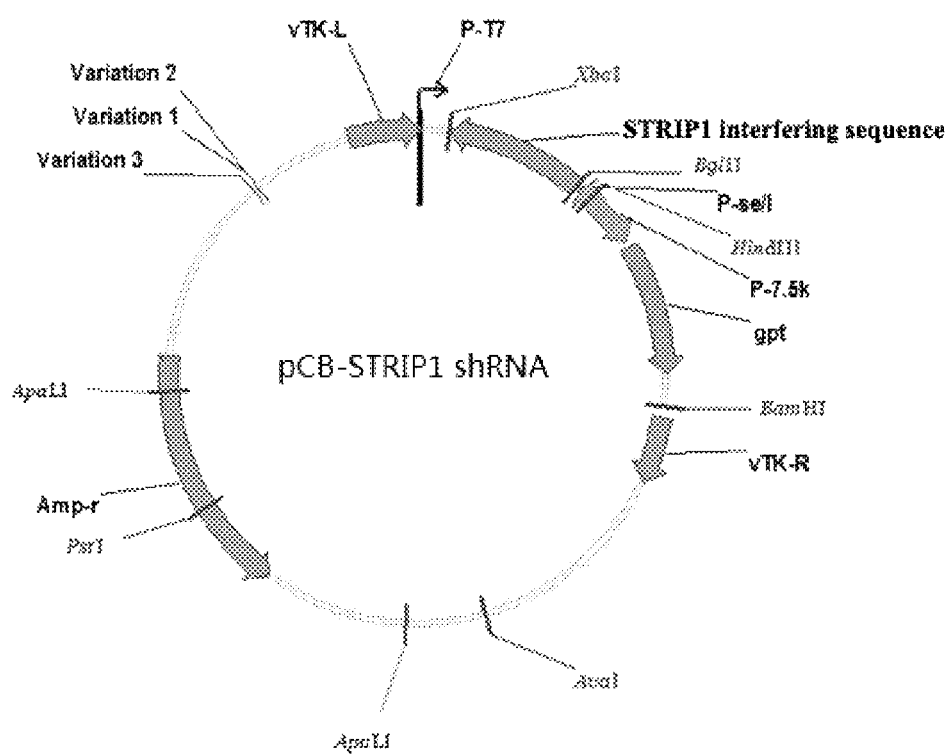
FIG. 6 shows the map of plasmid pCB-STRIP1 shRNA.

Example 6. Construction and Characterization of Vaccinia Viruses Expressing STRIP1 shRNA, Onco VV-STRIP1 shRNA 1. Construction of pCB-STRIP1 shRNA Recombinant Plasmids The pCB-STRIP1 shRNA recombinant plasmid was constructed according to the plasmid map shown in FIG. 6. DNA sequences encoding shRNA that specifically inhibit the expression of STRIP1 are shown in Table 1 as below, and of course RNA sequences can also be used for recombinant plasmid construction.

TABLE 1

Summary of DNA sequences encoding shRNA that specifically inhibit STRIP1 expression.

| Name | sequence | No. |
|---|---|---|
| 1 | 5'-CCGGGCTCAAGCACTTTAAGTTGAACTC GAGTTCAACTTAAAGTGCTTGAGCTTTTTG-3' | SEQ ID NO. 4 |
| 2 | 5'-CCGGCGAAAGCATCAAGACTCTGAACTC GAGTTCAGAGTCTTGATGCTTTCGTTTTTG-3' | SEQ ID NO. 5 |
| 3 | 5'-CCGGGCATCTGCTTCAGACTTGATTCTC GAGAATCAAGTCTGAAGCAGATGCTTTTTG-3' | SEQ ID NO. 6 |

DNA sequences 1, 2 and 3 encoding STRIP1 shRNA shown in Table. 1 were inserted into plasmid pCB through Bgl II and Xba I sites to construct pCB-STRIP1 shRNA #1, pCB-STRIP1 shRNA #2 and pCB-STRIP1 shRNA #3. The vTK-L and vTK-R regions of the PCB plasmid were homologous with the TK region of the wild-type vaccinia viruses, and the exogenous gene sequence was inserted into the TK region through homologous recombination, resulting in the deletion of TK. The replication of vaccinia viruses depends on TK, whereas the levels of TK in tumor cells are much higher than that in normal cells. Therefore, the TK-deficient vaccinia viruses have the characteristic of tumor specific replication.

In addition, the plasmid also contained xanthine-guanine phoshporibosyl transferase (gpt) gene as a screening gene. The gpt gene originates from *Escherichia coli*. In the presence of mycophenolic acid (MPA), which blocks the synthesis of guanine, viruses and cells will die because the nucleic acid synthesis cannot proceed normally. In the presence of the gpt gene, cells or viruses can use hypoxanthine and xanthine to synthesize guanine through alternative pathways, so that nucleic acid synthesis is not restricted. The wild-type viruses were eliminated by adding mycophenolic acid, hypoxanthine and xanthine to the culture solution to obtain purified recombinant viruses.

1. Recombination of the Western Reserve (WR) Vaccinia Virus with pCB-STRIP1 shRNA #1, pCB-STRIP1 shRNA #2 or pCB-STRIP1 shRNA #3 Plasmids.

(1) Appropriate number of 293A cells were inoculated in a 6 cm² petri dish.

(2) The culture medium was aspirated in the next day, 1 mL of Western Reserve (WR) vaccinia viruses were added gently (0.05-0.1 MOI, dilute with medium containing 2% serum) along the side wall, and cultured in an incubator with 5% $CO_2$ at 37° C. for 2 to 4 hours, with shaking for every 15 minutes.

(3) Transfection was performed in accordance with the kit (Effectene) instructions.

(4) After the cells are completely pathologically changed, viruses were collected under a biological safety hood into centrifuge tubes. Viruses were Frozen at −80° C. and thawed at 37° C., repeating for three times to make sure the cells are completely broken to release the viruses. The supernatants were collected through centrifugation at 2000 rpm for 5 min, then stored in −80° C. ultra-low temperature refrigerator for later use.

2. Screening of Recombinant Viruses (1) 293A cells were cultured in a culture dish to reach about 80%-90% confluence.

(2) Three screening drugs were prepared: xanthine, hypoxanthine, and mycophenolic acid.

(3) 500 µL virus solution was carefully added to each petri dish along the side wall, and placed in an incubator with 5% $CO_2$ at 37° C. for 2-4 hours. The suspended virus solution was aspirated and 3 mL fresh culture solution was added, containing 7.5 µL (1×) mycophenolic acid, 75 µL (1×) xanthine and 7.5 µL (1×) hypoxanthine.

(4) The cytopathic condition was observed every day. All cells and liquids were collected in a biological safety cabinet two or three days later, frozen and thawed for three times, then stored in an ultra-low temperature refrigerator at −80° C. for later use.

(5) This procedure was repeated for 3-4 times.

4. Picking Virus Plaques and Identification.

(1) The preparation of 5% low melting point gel: 0.25 g gel with low melting point was dissolved in 5 mL PBS, autoclaved at 121° C. for 20 minutes, then stored in a 4° C. refrigerator for later use.

(2) 293A cells in good condition were inoculated in six-well plates. When the cell density reached about 90%, the virus solution was serially diluted at a gradient of $10^{-4}$ to $10^{-6}$. After discarding old medium, 1 mL of diluted virus solution was added to each well, and cultured for 2-4h in an incubator. The boiled glue with low melting point was put in 40° C. water bath to keep warm, then mixed with DMEM culture medium to make the final concentration of 1.25%, using a pipette to quickly mix. After aspirating the suspended virus in the plates, 2 mL of culture medium containing 1.25% low melting point glue was carefully added along the side wall, without disturbing the cells, and then cultured in an incubator with 5% $CO_2$ at 37° C.

(3) The cytopathic condition was observed under an inverted microscope every day. Virus plaques were picked and added to 293A cells, and then cultured in an incubator with 5% $CO_2$ at 37° C. After cells were fully pathologically changed, the virus solution was collected into a 1.5 mL centrifuge tube in a hood and stored in an −80° C. ultra-low temperature refrigerator for further identification.

(4) PCR analysis based on the characteristics that wild-type virus has a complete TK region while the recombinant virus doesn't was performed to obtain purified vaccinia viruses oncoVV-STRIP1 shRNA #1, oncoVV-STRIP1 shRNA #2 and onco VV-STRIP1 shRNA #3.

Figure 7:
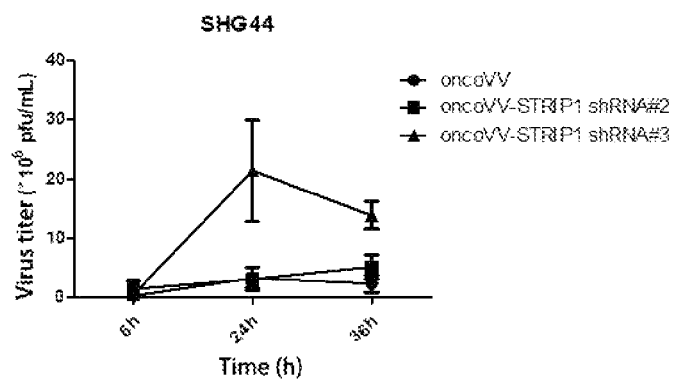
FIG. 7 shows the replication comparison among oncoVV-STRIP1 shRNA #2, oncoVV-STRIP1 shRNA #3 and the control virus oncoVV in SHG44 (A), BEL-7404 (B) as well as U87MG (C) cells.
Figure 7:
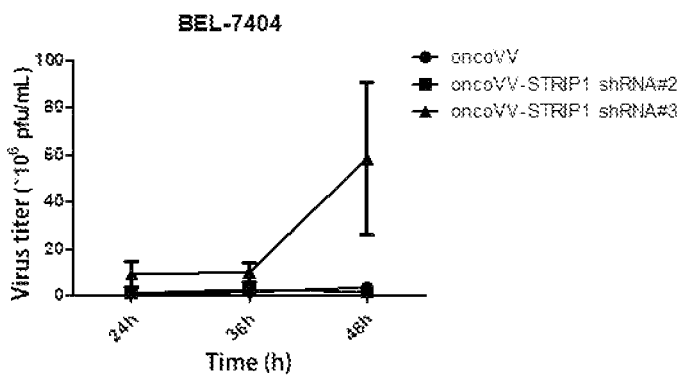
Figure 7:
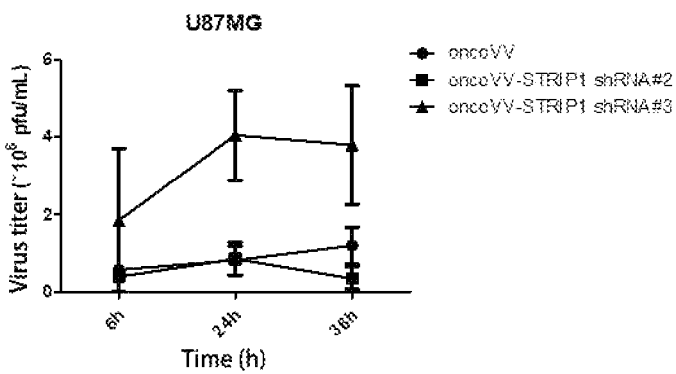
Figure 8A:
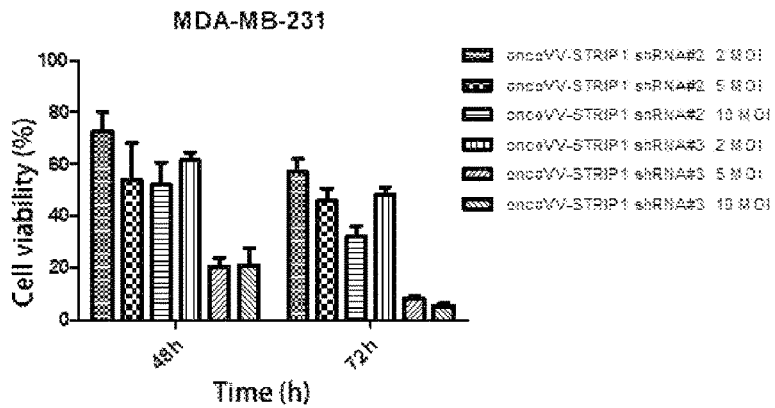
FIGs. 8A-8G show MTT assay for the in vitro antiproliferative effect of onco VV-STRIP1 shRNA #2 and oncoVV-STRIP1 shRNA #3 on MDA-MB-231 (A), BEL-7404 (B), U87MG (C), A549 (D), HCT116 (E), HT-29 (F) and DU145 (G) cells.
Figure 8B:
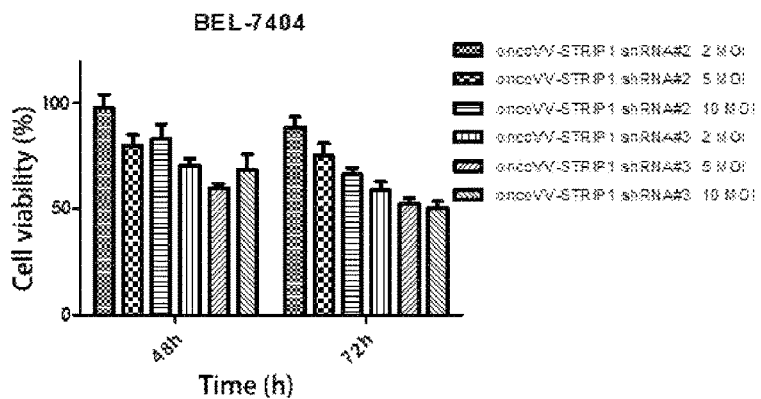
Figure 8C:
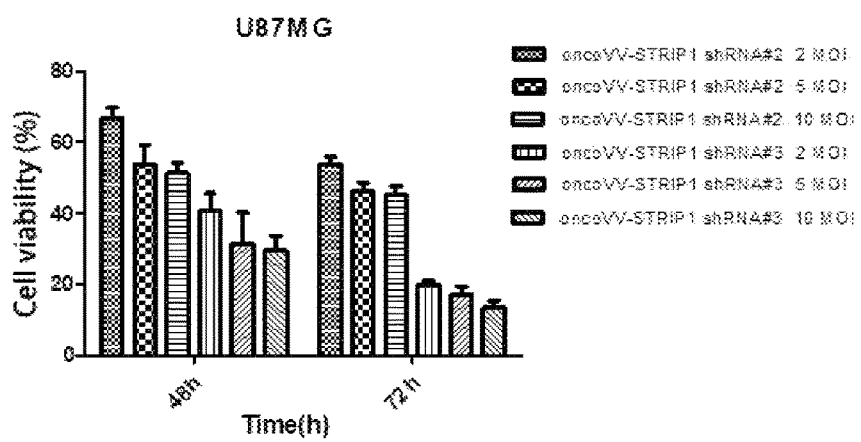
Figure 8D:
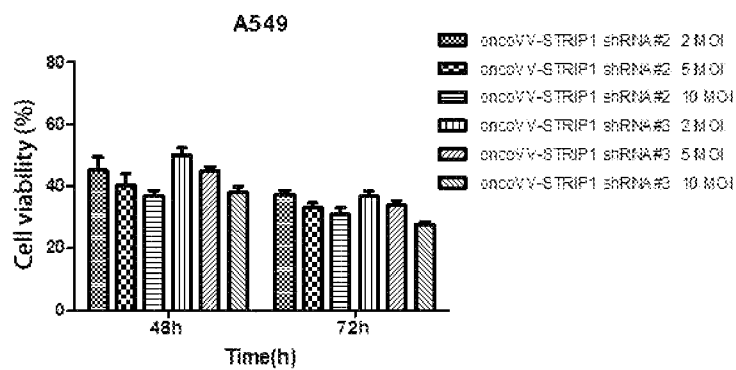
Figure 8E:
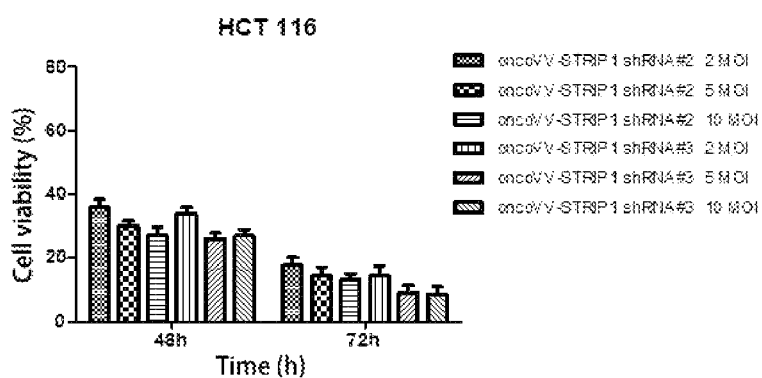
Figure 8F:
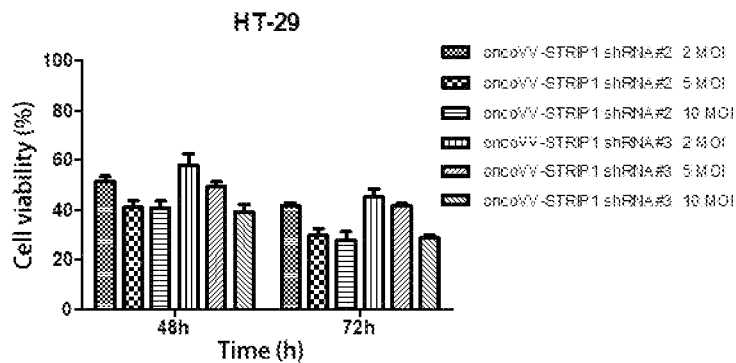
Figure 8G:
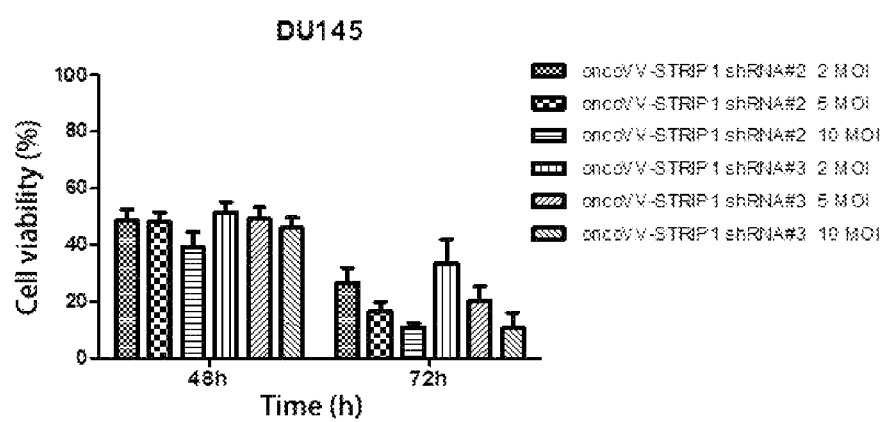

Example 7. The Replication Ability of Oncolytic Vaccinia Viruses Onco VV-STRIP1 shRNA was Significantly Higher than that of the Control Virus Hepatoma cells BEL-7404, glioma cells U87MG and SHG44 were inoculated into 96-well plates at the density of $5\times10^3$/well, 90 μL of cell culture medium was added into each well and cultured overnight. 5 MOI oncoVV-STRIP1 shRNA #2, oncoVV-STRIP1 shRNA #3 or control virus oncoVV was added to cells. Cells and culture medium were collected, and the replication efficiency of virus in the tumor cells was analyzed by $TCID_{50}$ method (median tissue culture infective dose). The method was as following:
(1) Plating cells: plating HEK293A cells into 96-well plates at $4\times10^3$ cells per well.
(2) Diluting viruses: virus samples were diluted in a sterile hood. Viruses were serial diluted with serum-free DMEM into gradients such as $10^{-3}$, $10^{-4}$, $10^{-5}$, $10^{-6}$, $10^{-7}$, $10^{-8}$, $10^{-9}$ and $10^{-10}$.
(3) Virus infection: the diluted virus samples were added into HEK293A cells, with 8 repeating wells for each concentration, and placed in an incubator with 5% $CO_2$ at 37° C. for 5-8 days.
(4) Calculation
Virus titer (T) calculation formula: For a 100 μL sample, $T=10^{1+d\,(s-0.5)}$;
d=log 10 dilution=1 (for a 10-fold dilution);
s=the sum of positive ratios (calculated from the first 10-fold dilution);
Convert $TCID_{50}$/mL to PFU/mL according to the following formula:
$T=ax\ 10^b\ TCID_{50}/mL=ax10^{b-0.7}\ PFU/mL$;
As shown in FIG. 7: the replication level of onco VV-STRIP1 shRNA #3 in the above three tumor cells was significantly higher than that of oncoVV-STRIP1 shRNA #2 and the control virus oncoVV.

Example 8. In Vitro Inhibitory Effects of Onco VV-STRIP1 shRNA #3 and Onco VV-STRIP1 shRNA #2 on Tumor Cells Analyzed by 3-(4,5-Dimethyl-thiazol-2-yl)-2,5-Diphenyltetrazolium Bromide (MTT) Method In this experiment, breast cancer cells MDA-MB-231, liver cancer cells BEL-7404, glioma cells U87MG, lung cancer cells A549, colorectal cancer cells HCT116 and HT-29, prostate cancer cells DU145 were inoculated into 96-well plates at the density of $5\times10^3$/well, 90 μL of cell culture medium was added into each well and cultured overnight. 2 MOI, 5 MOI or 10 MOI viruses were added to each well, with 6 replicating wells for each dosage. Cells without adding viruses served as the control. After 48h and 72h, 20 μL MTT reagent (5 mg/mL) was added to each well in dark, and cultured for 4 h. After aspirating the culture medium, 150 μL DMSO was added to each well, and then shaken for 10 minutes to fully dissolve the crystals. The OD value was measured under 490 nm.
The cell survival rate was calculated according to the measured OD value, and the formula is as following:

Cell survival rate=(OD value of treatment group−OD value of zero control group)/(OD value of control group−OD value of zero control group)× 100%

As shown in FIG. 8: Both oncoVV-STRIP1 shRNA #3 and oncoVV-STRIP1 shRNA #2 significantly inhibited the proliferation of tumor cells in vitro at a dose and time-dependent manner.

Figure 9:
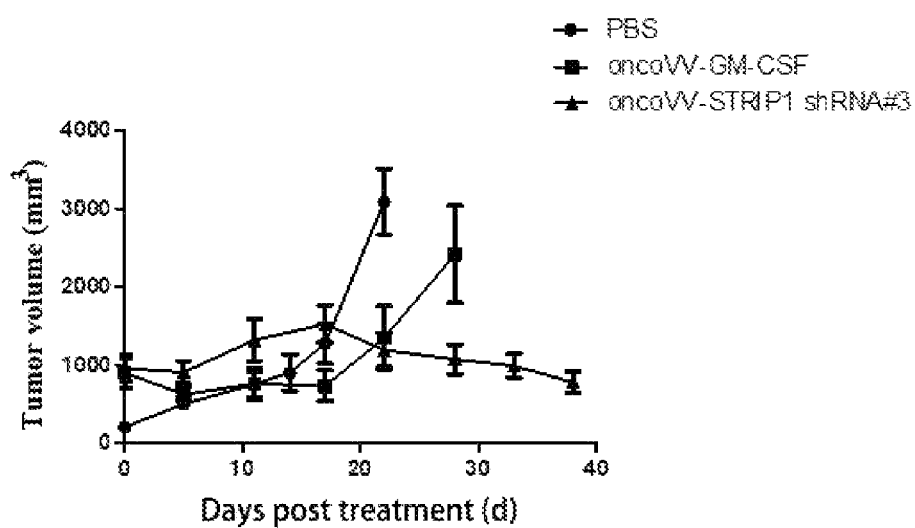
FIG. 9 shows the tumor inhibiting effect of onco VV-STRIP1 shRNA #3 on U87MG tumor-bearing mice in vivo. PBS and oncoVV-GM-CSF served as controls.

Experiment 9: Onco VV-STRIP1 shRNA Significantly Eliminated Transplanted U87MG Tumors in Mice Glioma cells U87MG were utilized to establish subcutaneous transplanted tumors in nude mice. OncoVV-GM-CSF, oncoVV-STRIP1 shRNA #3 or PBS were injected intraperitoneally, tumor volumes were measured regularly. OncoVV-GM-CSF is a virus similar to the oncolytic vaccinia virus drug Pexa-Vec (previously named JX-594) (Parato, K. A., C. J. Breitbach, et al. 2012. The oncolytic poxvirus JX-594 selectively replicates in and destroys cancer cells driven by genetic pathways commonly activated in cancers. Mol Ther 20 (4): 749-758.) which has entered clinical phase III. The animal experimental method was as following:
All animal experiments in this study were conducted strictly in accordance with the NIH laboratory animal instructions. Four-week-old female BALB/c nude mice are selected, U87MG cells were injected subcutaneously into the axillary ends of their forelimbs at $1\times10^7$ cells/100 μL cells per mice. The growth of the tumor was observed every day after the injection of cells, and measured with a micrometer, calculated the tumor volume (($mm^3$)−(length×$width^2$)/2). When the tumors grew to a stable state, mice were divided into 3 groups: PBS group, oncoVV-GM-CSF group and oncoVV-STRIP1 shRNA #3 group, each with 6-8 nude mice. Each nude mouse was injected intraperitoneally with $1\times10^7$ pfu viruses or PBS, and then the tumor volumes were measured regularly.
As shown in FIG. 9: Compared with PBS and onco VV-GM-CSF, oncoVV-STRIP1 shRNA #3 significantly eliminated transplanted U87MG tumors in mice.

Figure 10:
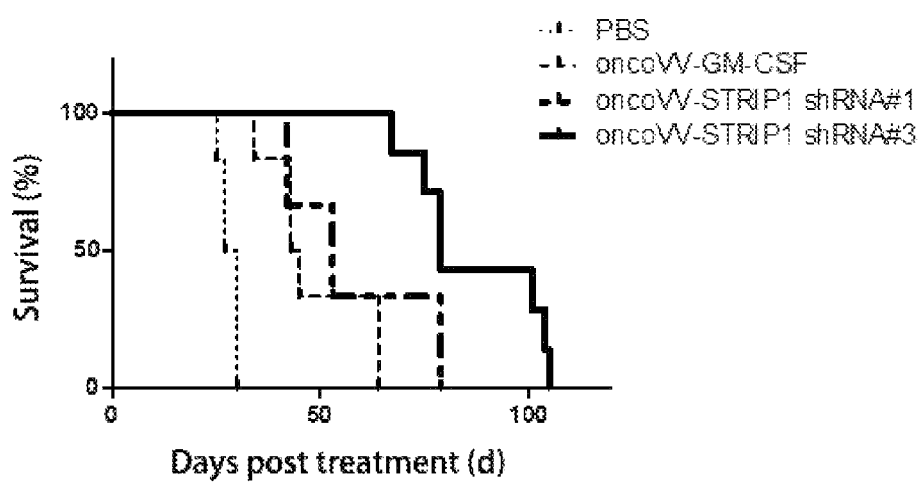
FIG. 10 shows the effects of oncolytic vaccinia virus onco VV-STRIP1 shRNA #1 and oncoVV-STRIP1 shRNA #3 on the survival of U87MG tumor-bearing mice. PBS and oncoVV-GM-CSF served as controls.

Example 10. Onco VV-STRIP1 shRNA Significantly Prolonged the Survival of U87MG Tumor-Bearing Mice Glioma U87MG cells were used to establish subcutaneous xenograft tumors in nude mice, mice were intraperitoneally injected with $1\times10^7$ PFU of oncoVV-GM-CSF, oncoVV-STRIP1 shRNA #1, oncoVV-STRIP1 shRNA #3, or an equal volume of PBS. The survival time of each mouse was recorded. Animal experimental methods were performed as described in Example 9.
The results are shown in FIG. 10: oncoVV-GM-CSF, oncoVV-STRIP1 shRNA #1 and oncoVV-STRIP1 shRNA #3 significantly prolonged survival of tumor-bearing mice as compared with that of PBS. The therapeutic effect of onco VV-STRIP1 shRNA #3 was significantly better than that of oncoVV-STRIP1 shRNA #1 and oncoVV-GM-CSF.

The preferred examples of the invention have been specifically described above, but the invention is not limited to these examples. Technicians familiar with the field can also make various equivalent variants or substitutions without against the creative spirit of this invention, and these equivalent variants or substitutions are all included within the limits of this claim

The invention claimed is:

1. A method for treating a tumor in a subject in need thereof, comprising:
   administering a therapeutically effective amount of striatin interacting protein (STRIP) inhibitors to the subject;
   wherein a striatin interacting protein is STRIP1; and
   the STRIP inhibitors are short hairpin RNA whose sequences are shown as SEQ ID No. 1, SEQ ID No. 2 or SEQ ID No. 3.

2. The method of claim 1, wherein the STRIP inhibitors is capable of reducing expression levels of anti-viral factors and anti-viral response in tumor cells.

3. The method of claim 1, wherein the STRIP inhibitors are administered to the subject using recombinant vectors that encode and express the STRIP inhibitors.

4. The method of claim 3, wherein the recombinant vectors of the STRIP inhibitors are vaccinia viruses expressing STRIP1 shRNA.

5. An anti-tumor drug composition, comprising:

active components; and medically acceptable excipients, carriers or diluents;

wherein the active components are any one of striatin interacting protein (STRIP) inhibitors; and the STRIP inhibitors are short hairpin RNA whose sequences are shown as SEQ ID No. 1, SEQ ID No. 2 or SEQ ID No. 3.

* * * * *